United States Patent Office 3,519,589
Patented July 7, 1970

3,519,589
ETHYLENE POLYMERS
Harold D. Lyons, Overland Park, Kans., assignor to Gulf Research & Development Company, Pittsburgh, Pa., a corporation of Delaware
No Drawing. Filed Aug. 1, 1966, Ser. No. 569,050
Int. Cl. C08f 45/24, 15/00
U.S. Cl. 260—29.6
5 Claims

ABSTRACT OF THE DISCLOSURE

Shelf-stable, high-solids, self-emulsifiable aqueous dispersions of water-insoluble ethylene-alkyl acrylate polymers having relatively low viscosities are obtained by the controlled hydrolysis of an ethylene-alkyl acrylate polymer so as to convert at least 55 mol percent of the acrylate groups to the amide form.

---

This invention relates to improved ethylene-alkyl acrylate polymer compositions and methods of manufacturing such ethylene-alkyl acrylate polymer compositions. In another aspect, this invention relates to shelf-stable, high-solids, self-emulsifiable aqueous dispersions of water-insoluble ethylene-acrylate polymers having relatively low viscosities.

It has been observed that ethylene-alkyl acrylate polymers are highly effective when employed as coating materials when applied to such materials as paper, woven fabrics, wood, metal, glass, and the like. Coating compositions can be prepared by producing, for example, a liquid dispersion of the ethylene-alkyl acrylate polymer and the resulting produced dispersion employed to provide a coating on the above named materials.

Aqueous dispersions of ethylene-alkyl acrylate polymers are particularly desirable as coating compositions. From an economical viewpoint it is highly desirable that the dispersions employed as coating compositions have a high solids (polymer) concentration and relatively low viscosities for ease in handling. A high solids concentration substantially reduces the quantity of dispersing medium conventionally required in coating processes and thereby substantially reduces the cost. Normally to maintain a viscosity of a coating dispersion at or below a maximum workable level it is necessary that the solids concentration of the dispersion be maintained undesirably low.

Accordingly, an object of my invention is to provide improved ethylene-alkyl acrylate polymer compositions and a method for preparing such polymer compositions.

Another object of my invention is to provide aqueous dispersions of ethylene-alkyl acrylate polymer compositions having surprisingly high solids concentrations and relatively low viscosities.

Another object of my invention is to provide shelf-stable, self-emulsifiable aqueous dispersions of ethylene-alkyl acrylate polymers having high solids concentrations and relatively low viscosities.

Other objects, advantages and features of my invention will be readily apparent to those skilled in the art from the following description and appendent claims.

By my invention a novel improved ethylene-alkyl acrylate polymer composition is prepared from an ethylene-alkyl acrylate copolymer having a melt index of at least 200 and containing an acrylate concentration in the range of 0.15 to 0.35 mol of acrylate per 100 grams of copolymer feed by hydrolyzing said copolymer in an aqueous medium to produce an ethylene-alkyl acrylate copolymer wherein at least 55 mol percent of the acrylate groups are hydrolyzed to the amide form and at least 10 mol percent of the acrylate groups are hydrolyzed to the carboxylate salt form.

The ethylene-alkyl acrylate polymers which are hydrolyzed by the process of this invention can be those polymers described by George E. Ham, Harry D. Anspon and William H. Byler in copending application Ser. No. 335,732, filed Jan. 6, 1964. As described therein, the polymers are ethylene-alkyl acrylate polymers in which the alkyl acrylate can be an alkyl ester of unsubstituted acrylic acid or a simple alpha-substituted acrylic acid, such as methacrylic acid. The ethylene-alkyl acrylate polymer employed as the starting material of this invention can be of a highly uniform character or of a non-uniform character inasmuch as the alkyl acrylate groups are evenly or randomly distributed throughout the polymeric chains. Presently preferred polymers employed as starting materials are the ethylene-lower alkyl acrylate copolymers, especially those of the lower alkyl acrylate esters of unsubstituted acrylic acid such as methyl acrylate.

"Ethylene groups" and "acrylate groups" as used herein are defined as those units of the polymer which correspond to the ethylene-alkyl acrylate monomers, respectively, which are polymerized in forming the polymer. The thermoplastic polymers employed as starting materials can be viewed generally as a polyethylene with a portion of the original acrylate comonomer molecule existing unincorporated in the main polyethylene chain as side chains or groups. Thus, in reference to the ethylene-methyl acrylate copolymers, as an illustration, the side chains have the structure

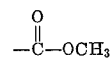

By the invention shelf-stable aqueous dispersions containing normally at least 50 weight percent solid polymeric materials are obtained having Brookfield viscosities of less than 1,000 cps. Such aqueous dispersions containing substantially higher solids concentration than heretofore possible have increased stability over hydrolyzed ethylene-alkyl acrylate polymers heretofore produced in that the novel aqueous dispersions of this invention show no change in appearance and exhibit no substantial increase of viscosity after relatively long storage periods. The polymeric compositions produced by the invention have lower surface tensions than those hydrolyzed ethylene-alkyl acrylate copolymers heretofore produced. This lower surface tension is reflected in improved coatability of the compositions.

The product shelf-stable aqueous dispersions of the invention are shelf-stable. "Shelf-stable" as the term is herein employed refers to the stability of the dispersion inasmuch as there is no appearance of significant change or change in viscosity after 48 hours' standing and customarily even after 30 days' storage in conventional glass containers at ambient room temperatures. The aqueous dispersions of this invention show unusual stability to temperature extremes, vis, that of freeze-thaw stability and stability to high temperatures such as boiling water temperature or higher. These aqueous dispersions further exhibit a high degree of mechanical stability as measured, for example, by exposure to agitation in a Waring blender for at least one minute at its common rotation speed of about 17,000 revolutions per minute.

The ethylene-alkyl acrylate polymers produced by the invention are water-insoluble. "Water-insoluble" as used herein refers to the inability of the fused solid ethylene-alkyl acrylate polymer to become substantially dissolved in water as measured, for example, by preparing a one-half mil cast film of the product polymer by conventional methods, placing a 10 x 10 centimeter sample in one liter of water maintained at a temperature of 30° C. for a period of 24 hours, removing the film from the water, drying the film to a constant weight at 120° C., and determining that the weight loss in the film when compared to the weight of the original film sample shall be less than 10 weight percent.

The product hydrolyzed ethylene-alkyl acrylate polymers of the invention are self emulsifiable. "Self-emulsifiable" as used herein refers to that property of the product polymer whereby one gram of the polymer in particulate form can be readily dispersed in 100 ml. of water in a stirred metal autoclave maintained at a temperature in the range of 180 to 300° C. to provide, in the absence of an emulsifying agent, a shelf-stable dispersion wherein the average particle size is less than three microns.

In the description of the polymer compositions produced by the process of this invention, the product ethylene-acrylate polymers refers to those polymers having a main polyethylene chain and containing units having at least one of the following structures:

(a) 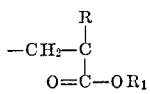

(b) 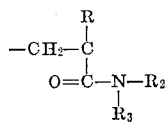

(c) 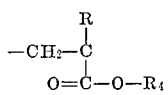

wherein R is selected from the group consisting of hydrogen and hydrocarbon groups, $R_1$ is selected from the group consisting of hydrogen and the alkali metals, $R_2$ and $R_3$ are independently selected from the group consisting of hydrogen, hydrocarbon groups and hydroxyalkyl groups, and $R_4$ is a hydrocarbon group. As herein employed, those units of the product polymer having the structure corresponding to the structure illustrated in (a) above and wherein $R_1$ is hydrogen, will be referred to as acrylate groups in acid form. Those units having the structure illustrated in (a) above wherein $R_1$ is an alkali metal will be referred to as acrylate groups in carboxylate salt form. Those units of the product polymer having the structure illustrated in (b) above will be referred to as acrylate groups in amide form and those units having the structure illustrated in (c) above will be referred to as acrylate groups in ester form.

Films produced by conventional means employing the novel polymeric dispersions of this invention exhibit surprisingly high gloss when compared to films heretofore produced from ethylene-alkyl acrylate copolymers. Additionally, films produced from aqueous dispersions of hydrolyzed ethylene-alkyl acrylate polymers heretofore known have difficulty in passing the extractables test applied to films employed in food packaging industry under FDA Regulation 121.2580. Heretofore, it has been necessary to employ hydrolyzed ethylene-alkyl acrylate copolymers having relatively low melt indices (substantially below 200) when the films produced from such copolymers are to be employed in the packaging of food products. Films prepared from the novel ethylene-alkyl acrylate polymer of this invention having melt indices substantially higher than 200 satisfactorily meet all requirements under the above named FDA regulation.

In a first embodiment the ethylene-alkyl acrylate polymer compositions of this invention are formed from the above described thermoplastic ethylene-alkyl acrylate polymers having groups corresponding to ethylene and an alkyl acrylate, by treatment of a thermoplastic ethylene-alkyl acrylate polymer in an aqueous medium with an alkali hydroxide and a nitrogenous base material to bring about hydrolysis of a self-emulsifiable portion of the ester groups to carboxylate salt groups and amide groups. The product polymer compositions have: at least 10 (preferably from 10-16) percent of the alkyl acrylate groups in carboxylate salt form and at least 55 (preferably from 55 to 75) percent of the alkyl acrylate groups in amide form, on a molar basis. Preferably less than 10 mol percent of the alkyl acrylate groups are in ester form. Normally, the product polymer compositions will have from 5 to 15 percent, on a molar basis, of the alkyl acrylate groups in acid form.

In a second embodiment of the invention the above described novel ethylene-alkyl acrylate polymer compositions can be formed by treating the ethylene-alkyl acrylate copolymer in a first step with alkali hydroxide and then treating the product of the alkali hydrolysis step with a nitrogenous base in a subsequent second treatment step.

The ethylene-alkyl acrylate feed to the hydrolysis zone comprises an ethylene-alkyl acrylate polymer wherein the acrylate concentration shall range between 0.15 and 0.35 mol (preferably from 0.21 to 0.28 mol).

The ethylene-alkyl acrylate polymer feed is hydrolyzed by contacting the feed material in the hydrolysis zone with an alkali hydroxide (preferably potassium hydroxide or sodium hydroxide) and a nitrogenous base. A preferred nitrogenous base is ammonium hydroxide, although amines can also be employed as the nitrogenous base. Suitable amines include primary and secondary amines capable of converting the alkyl acrylate ester group to the corresponding amide form. Illustratively, low mono- and di-alkyl substituted amines such as methylamine, ethylamine, isopropylamine, diethylamine, ethanolamine, octylamine and the like can be employed.

The nitrogenous base can be introduced independently and simultaneously into the hydrolyzing zone with the alkali hydroxide or in admixture with other feed materials to the hydrolyzing zone; or in the alternative, the resultant product mixture from the alkali hydroxide hydrolyzing step can be reacted with the nitrogenous base in a second subsequent hydrolyzing step.

As previously set forth the thermoplastic polymer feed is reacted with the alkali hydroxide in such proportions that at least 10 mol percent of the acrylate groups are converted to the carboxylate salt form. Generally stoichiometric concentrations of the alkali hydroxide are maintained in the hydrolyzing zone. Sufficient water is generally maintained in the hydrolysis zone to provide a solids concentration in the range of 15–25 weight percent.

The conversion of the thermoplastic polymer in the hydrolysis zone is conducted in an aqueous liquid phase at a temperature sufficient to hydrolyze the ester groups. A temperature of at least 220° C. is employed in the hydrolyzing zone. Normally the hydrolyzing temperature employed shall be in the range of 220 to 320° C.

It has been found suitable to conduct the hydrolyzing step in a pressurized reaction zone with the pressure in the reaction zone sufficient to maintain the hydrolysis reaction in liquid phase. A residence time normally in the range of about 4 to about 20 hours is employed, although it is within the scope of this invention to employ residence times outside this range. It is possible under specific conditions to employ residence times as low as 10 minutes. Preferably, although not to be limited thereto, the hydrolyzing reaction mixture is agitated throughout the conversion of the acrylate groups. Longer residence times and higher reaction temperatures can be used to advantage when the esters employed in the formation of the polymer feed to the hydrolysis zone are derived from unsubstituted acrylic acid or methacrylic acid, where the $C_{12}$ and higher alkyl groups contribute the alkyl portion.

The thermoplastic ethylene-alkyl acrylate polymer feed introduced into the hydrolyzing zone is preferably in ground form, but can satisfactorily be added as cubes or pellets in the size such as is conventional in marketed solid polyethylene. The alkali hydroxide can be introduced into the hydrolyzed zone as a solid or as an aqueous solution of the hydroxide.

The nitrogenous base can be introduced independently into the hydrolyzing zone, or the nitrogenous base can be introduced into the hydrolyzing zone in admixture with other cited materials such as the alkali hydroxide. As heretofore noted the effluent product mixture from the alkali hydroxide hydrolyzing step, in an alternative method, can be reacted with a nitrogenous base in a second hydrolyzing step. Other reaction conditions maintained during the second hydrolyzing step can be the same as those employed in the hydrolyzing step wherein both the nitrogenous base and alkali hydroxide are utilized to produce the inventive composition by a single hydrolysis step.

In the production of a product polymer wherein at least 55 mol percent of the acrylate groups are converted to the amide form, an excess of the nitrogenous base is normally employed. Where ammonium hydroxide is utilized as the nitrogenous base, an excess of at least 15 mol percent ammonia is normally employed. As heretofore noted ammonium hydroxide is a preferred nitrogenous base to be employed in conversion of the acrylate groups to the amide form.

The hydrolysis of the ethylene-alkyl acrylate polymer by the invention can be conducted as a batch process or as a continuous process.

The product of the hydrolysis reaction comprises an aqueous dispersion of a water-insoluble, self-emulsifiable alkyl acrylate polymer wherein the concentration of the normally solid materials in the aqueous dispersion is in the range of 15–25 weight percent. The aqueous dispersion product of the hydrolysis reaction can be subjected to a conventional stripping process to produce a water-insoluble, self-emulsifiable aqueous dispersion of an ethylene-alkyl acrylate polymer having a solids concentration of normally at least 50 weight percent. The stripping or concentration process step can be effected by, for example, heating the aqueous dispersion product of the hydrolysis step to a temperature of 40 to 80° C. with the stripping zone maintained at a pressure of about 20 mm. Hg.

The solids concentrations of aqueous dispersions of shelf-stable, self-emulsifiable ethylene-alkyl acrylate polymers prepared by prior art hydrolyzing process are normally in the range of 15–25 weight percent. Attempts to increase the solids concentration of such prior art dispersions has resulted in coagulation of the solids or formation of a separate solids phase in combination with an aqueous dispersion. However, by the invention, aqueous dispersions of shelf-stable, water-insoluble, self-emulsifiable ethylene-alkyl acrylate polymers containing between 65 and 70 weight percent solids are readily obtainable.

Previous prior art attempts to increase the solids concentrations of the aqueous dispersions of self-emulsifiable ethylene-alkyl acrylate polymers heretofore produced has also resulted in an undesirable substantial increase in the viscosity of such dispersions. It has also been observed that the viscosity of such prior art dispersions rapidly increases with the passage of time. This increase of viscosity increases the difficulty and, therefore, the cost, of employing such dispersions in commercial applications such as the coating of paper. The high-solids containing aqueous dispersions of the invention have surprisingly low viscosities and are viscosity stable in that the viscosities of such dispersions do not substantially increase even after long storage periods.

The aqueous dispersions of this invention are, as heretofore noted, shelf-stable without the employment of emulsifying agents. It is, however, within the scope of this invention to add conventional emulsifying agents to the inventive aqueous dispersions without disrupting the state of the dispersions. These emulsifying agents have been useful in admixing the dispersions provided in this invention with polymeric emulsions requiring emulsifying agents for stability.

The solid ethylene-alkyl acrylate polymer can be recovered from the hydrolysis zone effluent mixture by the addition of an electrolyte, such as sodium chloride, or by the use of a strong mineral acid to coagulate the polymer particles. The coagulant can ordinarily be reconstituted to the dispersion state after thorough water washing, followed by appropriate heat treatment with a small amount of caustic, or ammonia or both.

Various water-miscible solvents can be added to the shelf-stable dispersions of the self-emulsifiable ethylene-alkyl acrylate polymers without destruction of the product dispersions. For example, it has been found that the lower alkanols, miscible with water, such as methanol, ethanol, and isopropanol, can be added to the dispersions. It has been observed that these water-miscible solvents can be added in relatively large quantities, such as up to about an equivalent volume or greater, without disturbing the shelf-stability of the dispersion.

These ethylene-alkyl acrylate dispersions of the invention because of their solvent capability can be usefully employed in the coating of hydrophobic substances, such as pre-existing polymeric surfaces; for example, pre-existing polyethylene surfaces as film or otherwise. These organic solvent containing dispersions also lend themselves to feasible cast films manufacture, with the cast films exhibiting a high tensile value equivalent to high molecular weight polyethylene film. In addition to the film properties heretofore described, these cast films further exhibit an excellent low elongation value.

The ethylene-alkyl acrylate dispersions of this invention can be employed as ingredients in paints, paper-treating compositions, polishes and the like. As to paints, for example, the required pigments, thickener, and other agents can be added dry to the aqueous dispersions.

The coated paper resulting from one or more applications of the dispersions of this invention following conventional coating techniques show good moisture-vapor values as measured by conventional tests. Surprisingly, the coating of the paper exhibits a high resistance to creasing without great loss of resistance to water transmission. The product dispersions have interesting potential utility in the treatment of fabrics.

The following examples are in further illustration of the objects and advantages of the invention, but it is not intended that the invention should be limited to the specific embodiments illustrated therein. The melt index of polymer compositions prepared by the process of this invention is determined by ASTM D 1238–57 T. The viscosity of the aqueous dispersions of this invention is measured by employing the Brookfield Viscometer, Model LVF, utilizing a spindle speed of 60 r.p.m. with the viscosity measured at the temperature of 23° C.

EXAMPLE 1

In this example the effectiveness of the invention to produce water-insoluble, self-emulsifiable aqueous dispersions of ethylene-alkyl acrylate polymer compositions, each of the dispersions having a high solids concentration and a low viscosity, is illustrated. In each of the following runs presented below in Table I, 500 grams of an ethylene-methyl acrylate copolymer containing 18 weight percent methyl acrylate and having a melt index of 1750 are subjected to a hydrolysis reaction employing 16 grams of a 45 weight percent solution of potassium hydroxide and the listed quantity of ammonium hydroxide.

The product recovered in each of the runs is a water-insoluble, self-emulsifiable aqueous dispersion of an ethylene-methyl acrylate copolymer having a Brookfield viscosity and weight percent solids concentration as shown below in Table I. In each run the aqueous dispersion recovered is stripped by heating the product dispersion under vacuum to produce water-insoluble, self-emulsifiable aqueous dispersions of ethylene-methyl acrylate copolymer having the low Brookfield viscosity and high weight percent of solids listed below in Table I. The composition of the product polymer compositions obtained in each of the runs as determined by conventional testing procedures is as shown below in Table I.

mol percent of the acrylate groups are hydrolyzed to the carboxylate salt form, 73.5 mol percent of the acrylate groups are hydrolyzed to the amide form, 5.8 mol percent of the acrylate groups are in the acid form, and 4.8 mol percent of the acrylate groups remain in the ester form.

| | | | | | Before stripping | | After stripping | | Product polymer composition—acrylate groups, mol percent | | | |
|---|---|---|---|---|---|---|---|---|---|---|---|---|
| Run No. | Ammonium hydroxide, ml.[1] | Water, ml. | Reaction time, hours | Temp., degrees C. | Wt. percent solids | Visc., cps. | Wt. percent solids | Visc., cps. | Carboxylate salt | Amide | Acid | Ester |
| 1 | 1,000 | 600 | 6 | 280 | 24.0 | 5.0 | 60.0 | 646 | 15.0 | 69.0 | 14.7 | 1.5 |
| 2 | 1,000 | 600 | 4 | 280 | 23.2 | 4.9 | 55.2 | 125 | 14.3 | 66.0 | 16.3 | 3.5 |
| 3 | 1,600 | | 6 | 240 | 24.4 | 6.0 | 52.2 | 263 | 15.5 | 65.7 | 14.4 | 4.6 |
| 4 | 700 | 900 | 2 | 300 | 24.4 | 5.8 | 50.8 | 350 | 14.4 | 59.0 | 20.0 | 6.4 |
| 5 | 1,000 | 600 | 6 | 280 | 23.6 | 4.8 | 59.2 | 221 | 14.3 | 68.5 | 13.8 | 3.5 |
| 6 | 1,000 | 600 | 6 | 280 | 24.8 | 4.8 | 58.8 | 92 | 14.1 | 70.9 | 11.7 | 3.4 |
| 7 | 1,000 | 600 | 6 | 280 | 24.2 | 4.6 | 61.0 | 351 | 14.8 | 69.5 | 12.3 | 3.4 |
| 8 | 1,600 | | 6 | 260 | 26.0 | 5.1 | 54.8 | 290 | 11.8 | 70.6 | 11.8 | 5.9 |
| 9 | 1,500 | 100 | 6 | 270 | 24.8 | 5.2 | 56.6 | 159 | 12.0 | 69.2 | 13.0 | 5.8 |
| 10 | 1,300 | 300 | 6 | 280 | 24.8 | 5.1 | 56.0 | 210 | 13.7 | 72.7 | 9.3 | 4.4 |
| 11 | 1,000 | 600 | 6 | 280 | 23.2 | 4.6 | 57.6 | 108 | 14.9 | 72.0 | 8.2 | 5.2 |

[1] 28 weight percent ammonia.

From the above, the effectiveness of the invention to produce a water-insoluble, self-emulsifiable aqueous dispersion of an ethylene-alkyl acrylate polymer having a solids content of at least 50 weight percent and a Brookfield viscosity of less than 1000 cps. is clearly demonstrated.

EXAMPLE 2

The criticality of employing a relatively high melt index ethylene-alkyl acrylate copolymer in preparation of an aqueuos dispersion of an ethylene alkyl acrylate wherein at least 50 mol percent of the acrylate groups are converted to the amide form is illustrated in this example. 500 grams of an ethylene-methyl acrylate copolymer containing 20.0 weight percent methyl acrylate and having a melt index of 2.04 is introduced into a stirred reactor containing 600 ml. of water. 17.3 grams of a 45 weight percent potassium hydroxide solution and 1,000 ml. of an ammonium hydroxide solution containing 28.0 weight percent ammonia is also introduced into the reactor. With agitation, the reactor is maintained at 280° C. for six hours. The product recovered from the reactor is a solid. Analysis of the solid indicates that 14.6 mol percent of the acrylate groups are converted to the potassium salt form, 76.0 mol percent of the acrylate groups are converted to the amide form, 5.0 mol percent of the acrylate groups are converted to the acid form, and 4.0 mol percent of the acrylate remain in the ester form.

EXAMPLE 3

In this example the criticality of employing an ethylene-alkyl acrylate copolymer having a melt index of at least 200 to produce an aqueous dispersion of an ethylene alkyl acrylate polymer containing at least 50 weight percent solids is demonstrated. 1,000 grams of an ethylene-ethyl acrylate copolymer containing 24.0 weight percent ethyl acrylate and having a melt index of 18 is introduced into a stirred reactor containing 600 ml. of water. 18.0 grams of .45 weight percent potassium hydroxide and 1,000 ml. of ammonium hydroxide (28.0 weight percent ammonia) are also introduced into the reactor. With agitation, the reaction mixture is maintained at a temperature of 280° C. for a period of six hours.

A product aqueous dispersion of an ethylene-ethyl acrylate polymer containing 24.4 weight percent solids and having a Brookfield viscosity of 7.7 is recovered from the reactor. Upon heating the effluent mixture to 60° C. under a pressure of 20 mm. Hg as to concentrate the solids, an aqueous dispersion having a maximum solids concentration of 46.0 weight percent is obtained. The Brookfield viscosity of the concentrated solids mixture is 420 cps. Continued heating of the concentrated dispersion results in the coagulation of the dispersion to form solids.

Analysis of the hydrolysis product indicates that 15.8 mol percent of the acrylate groups are hydrolyzed to the carboxylate salt form, 73.5 mol percent of the acrylate groups are hydrolyzed to the amide form, 5.8 mol percent of the acrylate groups are in the acid form, and 4.8 mol percent of the acrylate groups remain in the ester form.

EXAMPLE 4

The necessity of employing an ethylene-alkyl acrylate polymer having an acrylate content of at least 0.15 mol acrylate per 100 grams of copolymer feed is demonstrated in this example. 500 grams of an ethylene-methyl acrylate copolymer containing 10.5 weight percent (.122 mol) methyl acrylate and having a melt index of 859 is introduced into a stirred reactor. 9.0 grams of 45 weight percent potassium hydroxide solution, 1,000 ml. of ammonium hydroxide (28.0 weight percent ammonia) and 600 ml. of water are also introduced into the reactor. The reaction mixture is maintained, with agitation, at a temperature of 280° C. for a period of six hours.

The product of the hydrolysis reaction is a solid and analysis of the solid indicates that 15.5 mol percent of the acrylate groups are in the potassium salt form, 76.5 mol percent of the acrylate groups are in amide form, and 8.2 mol percent of the acrylate groups are in acid form.

EXAMPLE 5

The aqueous dispersion of Run 3 of Table I, obtained upon stripping the effluent mixture of the hydrolysis reaction, is stored in a glass container at ambient room temperatures for a period exceeding four months. The Brookfield viscosity after storage is 320 cps., an increase of only 67 cps. There is no separation of solid material from the aqueous dispersion. By appearance and measured viscosity it is clearly established by this example that the ethylene-alkyl acrylate aqueous dispersions of this invention are shelf-stable.

EXAMPLE 6

The criticality of hydrolyzing at least 55 mol percent of the acrylate groups to amide form is demonstrated in this example. 500 grams of an ethylene-methyl acrylate copolymer containing 18.0 weight percent methyl acrylate and having a melt index of 1,750 is introduced into a stirred reactor. 600 ml. of water, 16.0 grams of a 45 weight percent solution of potassium hydroxide, and 1,000 ml. of ammonium hydroxide (28.0 weight percent ammonia) are also introduced into the reactor. The reactor is maintained at a temperature of 240° C. for a period of six hours.

The product of the hydrolysis reaction is a self-emulsifiable, aqueous dispersion of an ethylene-methyl acrylate polymer having a solids concentration of 25.2 weight percent and a Brookfield viscosity of 10.0 cps. Upon stripping the effluent mixture to provide a self-emulsifiable aqueous dispersion of the product polymer having a solids concentration of 46.0 weight percent, the viscosity of the stripped dispersion is increased to 5,340 cps. Analysis of the product polymer illustrates that 14.6 mol percent of the acrylate groups are hydrolyzed to the potassium salt form, 43.5 mol percent of the acrylate groups are hydrolyzed to the amide form, 25.2 mol percent of the acrylate groups are hydrolyzed to the acid form, and 16.4 mol percent of the acrylate groups remain in ester form.

EXAMPLE 7

A 50 lb. M.G. B1 kraft base sheet is coated with the polymer composition produced in Run No. 1 of Table I to provide a paper having 7.0 pounds of polymer coating per 3,000 square feet. The surface tension of the polymer composition is 55.0 dynes/centimeter. The coated paper is cured at 130° C. for three minutes in a forced-air circulating oven. The coated paper has a high gloss and is resistant to moisture-vapor transmission. A second coating is applied in like manner to the coated paper to produce a coated paper having a high gloss and resistant to moisture-vapor transmission.

Although the invention has been described with reference to specific materials, embodiments and details, various modifications and changes, within the scope of this invention, will be apparent to one skilled in the art and are contemplated to be embraced in the invention.

What is claimed is:
1. A shelf-stable, self-emulsifiable aqueous dispersion of a water-insoluble ethylene-alkyl acrylate polymer having a melt index of at least 200 and containing 0.15–0.35 mol of acrylate monomer per 100 grams of said polymer and wherein (1) at least 10 mol percent of the acrylate groups are in alkali metal salt form, and (2) at least 55 mol percent of the acrylate groups are in amide form, said aqueous dispersion containing at least 50 weight percent solids and having a Brookfield viscosity less than 1,000 cps.

2. The shelf-stable aqueous dispersion of claim 1 wherein the acrylate concentration of said polymer is in the range of 0.21 to 0.28 mol per 100 grams of said polymer.

3. The shelf-stable, self-emulsifiable aqueous dispersion of claim 1 wherein from 5 to 15 mol percent of the alkyl acrylate groups are in acid form and less than 10 mol percent of the acrylate groups are in ester form.

4. The shelf-stable, self-emulsifiable aqueous dispersion of claim 1 wherein the concentration of solids in said aqueous dispersion is at least 65 weight percent and the Brookfield viscosity of said aqueous dispersion is less than one thousand cps.

5. The shelf-stable, self-emulsifiable aqueous dispersion of claim 1 wherein from 10 to 16 mole percent of the acrylate groups are in carboxylate salt form and from 55 to 75 mole percent of the acrylate groups are in amide form.

References Cited

UNITED STATES PATENTS

| | | | |
|---|---|---|---|
| 3,214,488 | 10/1965 | O'Donnell et al. | 260—854 |
| 3,249,570 | 5/1966 | Potts et al. | |
| 3,337,488 | 8/1967 | Lyons et al. | |
| 3,337,517 | 8/1967 | Anspon | 260—86.7 |

MURRAY TILLMAN, Primary Examiner

H. ROBERTS, Assistant Examiner

U.S. Cl. X.R.

117—138.8, 155, 161; 260—50.3, 86.7